United States Patent [19]

MacHattie

[11] 3,968,685
[45] July 13, 1976

[54] TRANSISTOR ANEMOMETER

[75] Inventor: Lloyd E. MacHattie, Willowdale, Canada

[73] Assignee: Her Majesty the Queen in right of Canada as represented by the Minister of National Defence

[22] Filed: Feb. 6, 1974

[21] Appl. No.: 439,997

[30] Foreign Application Priority Data
Feb. 16, 1973 Canada .............................. 163897

[52] U.S. Cl. ................................................ 73/204
[51] Int. Cl.$^2$ ............................................. G01F 1/68
[58] Field of Search ..................... 73/204, 362 SC; 307/310

[56] References Cited
UNITED STATES PATENTS

| | | | |
|---|---|---|---|
| 2,696,739 | 12/1954 | Endres | 307/310 |
| 3,192,405 | 6/1965 | Patchell | 307/310 |
| 3,199,348 | 8/1965 | Salera | 73/204 |
| 3,638,049 | 1/1972 | Bom | 307/310 |
| 3,686,517 | 8/1972 | Sexton | 307/310 |
| 3,700,934 | 10/1972 | Swain | 307/310 |
| 3,733,897 | 5/1973 | Herzl | 73/194 |
| 3,780,585 | 12/1973 | Milo | 307/310 |
| 3,800,169 | 3/1974 | Diaz | 307/310 |

OTHER PUBLICATIONS

Steedman, A Solid State Oceanographic Current Meter in J of Physics (G.B.), vol. 5, No. 12, Dec. 1972.

*Primary Examiner*—Herbert Goldstein
*Attorney, Agent, or Firm*—R. William Wray & Associates

[57] ABSTRACT

An anemometer includng a transistor in a transistor circuit with suitable voltages applied thereto and a semiconductor diode connected through resistors across the transistor. An output voltage is obtained, representative of the velocity of the wind incident on the anemometer, by taking the difference between the forward voltage drop across the base-emitter junction of the transistor and the voltage drop across the semiconductor diode.

3 Claims, 2 Drawing Figures

TRANSISTOR ANEMOMETER

BACKGROUND OF THE INVENTION

This invention relates to anemometers for measuring the flow velocity of a fluid, e.g. air.

Anemometers have previously been designed for measuring wind velocity electrically. One previously proposed type is the hot wire anemometer which is of the convection cooling or heat loss type of anemometer and wherein the hot wire is usually operated so as to maintain its temperature and hence resistance at a contant value. The electric power, or voltage, needed to do this is the observed variable which is related to the wind velocity by calibration in a wind tunnel. However, in order to obtain convenient resistance values, the wire must be extremely fine and this results in it being relatively expensive, fragile and requiring frequent cleaning to maintain its calibration. If these conditions are not met then it is rather bulky, sluggish in response and requires relatively excessive power. Furthermore, it is not a simple matter to compensate it for wide variation in ambient temperature whilst the power increases considerably towards the lower end of the temperature range and in high winds.

Another previously-proposed anemometer is a thermistor anemometer. In this anemometer the thermistor resistance varies with ambient temperature and in order to obtain a measurement of the termistor power, which corresponds to a measure of the required wind velocity, it is necessary to obtain two manual settings and two meter readings, whereafter the voltage and current readings must be multiplied together. Again the power increases considerably in high winds and although this instrument can be temperature compensated over a wide range, it suffers from considerable disadvantages and cannot be regarded as effectively giving direct readings of wind velocity.

It is an object of the present invention to provide an anemometer which does not suffer from all the disadvantages of the above-mentioned anemometers and which can conveniently be constructed so as to provide a portable direct-reading battery-powered anemometer instrument.

Accordingly, the present invention provides an anemometer comprising a transistor connected in a transistor circuit, compensating means connected with said transistor circuit, and means for obtaining an output voltage representative of the difference between the forward voltage drop across the base-emitter junction of the transistor and the voltage drop across said compensating means, whereby said output voltage is substantially independent of the ambient temperature and is proportional to the temperature rise of said transistor above the ambient temperature.

More particularly, the present invention provides an anemometer comprising a transistor connected in a transistor circuit, a semiconductor diode compensating means connected in parallel with said transistor, and means for obtaining an output voltage representative of the difference between the forward voltage drop across the base-emitter junction of the transistor and the voltage drop across said semiconductor diode, whereby said output voltage is substantially independent of the ambient temperature and is proportional to the temperature rise of said transistor above the ambient temperature.

DRAWINGS

An embodiment of the present invention will now be described with reference to the accompanying drawings of:

FIGS. 1 and 2 which diagrammatically illustrate typical circuits for use in an anemometer instrument according to the present invention.

DETAILED DESCRIPTION

Figure 1:
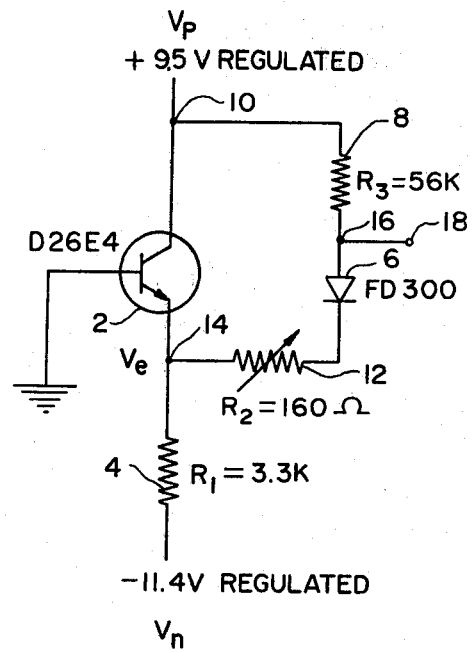

The transistor circuit comprises a transistor 2, which may conveniently be a G.E. type D26E4 bead transistor, having its base electrode connected to ground as shown. Its collector electrode is connected to a source of voltage (not shown) providing a voltage, $V_p$, having an illustrated value of +9.5 volts regulated, as shown in FIG. 1.

The emitter electrode of transistor 2 is connected through a 3.3K ohm resistor 4 to a source (not shown) of voltage $V_n$, having an indicated value of −11.4 volts regulated.

As will be seen, a semiconductor diode 6, which may be a type FD300, is connected in parallel with the transistor 2 between its collector and emitter electrodes. The diode 6 is connected through a resistor 8, having a value of 56K ohms to the point 10 connected to the collector electrode while the other side of semiconductor diode 6 is connected through a resistor 12 to the point 14 connected to the emitter electrode of the transistor 2. Instead of diode 6 a transistor could be used to provide a semiconductor p-n junction.

The resistor 12 may conveniently be adjustable, for a reason to be explained below, whilst the potential at point 14 in the circuit is identified as $V_e$, i.e. the forward drop across the base-emitter junction.

An output from the illustrated circuit is obtained from the junction 16 of diode 6 and resistor 8 which output is obtained at output terminal 18.

In operation, the G.E. type D26E4 bead transistor 2 is mounted with full length vertical leads whereby the air flow conditions are similar for all horizontal wind directions and heat flow along the leads is minimized. After assembly, the anemometer instrument according to the present invention may be calibrated in a wind tunnel.

If we assume that the base currect is negligible compared to the collector current (i.e. $h_{FE}$ is large), the transistor dissipation is easily shown to be $$(V_p - V_e) \left[ \frac{V_e - V_n}{R_1} - \frac{V_e}{R_3} \right]$$

where $R_1$ is the value of resistor 4 and $R_3$ is the value of resistor 8.

It will be appreciated that in the above formula for transistor dissipation the calculation is, to some extent, approximate in that the fraction of the emitter current which consists of base current is neglected, i.e. collector current is assumed equal to the emitter current. Furthermore, the variation in the voltage drop across resistor 8 ($R_3$) with wid (some 40mv out of 9.5 volts) is also neglected.

With the circuit values indicated in FIG. 1, the transistor dissipation works out to be about 31 milliwatts. The effect of a small change in $V_e$ on the voltage factor within the first brackets in the above formula is opposite to its effect on the current factor within the second brackets in the above formula. $V_p$ and $V_n$ have been so chosen in the illustrated circuit that the two effects cancel whereby the dissipation of transistor 2 is independent of temperature.

As mentioned, $V_e$ gives the forward drop across the base-emitter junction of transistor 2 and this is a linear measurement of the transistor temperature, since the emitter current of transistor 2 is maintained sensibly constant. It was found that the value of $V_e$ varies from about −600mv. at 20°C to −730 mv. at − 40°C. In the illustrated circuit as used in the constructed embodiment, compensation for ambient temperature variation was achieved, as will be understood from the above description, by taking the difference between $V_e$ and the voltage drop across the silicon diode 6 which is supplied with constant current at negligible dissipation and whose temperature coefficient is the same as that of transistor base-emitter voltage $V_e$. The temperature coefficients of the transistor 2 and diode 6 can, of course, be varied a little by selecting their respective currents by means of resistors 4 and 8 which determine the respective currents. The value of resistor 12 was adjusted to give zero output when transistor 2 and diode 6 were maintained at the same temperature.

From the above, it will be seen that the output voltage obtained at output terminal 18 is proportional to the temperature rise of the transistor 2 above the ambient temperature. For example, in the constructed embodiment under the conditions referred to and in still air, the output voltage had a value of about +40 millivolts whilst in a high wind the voltage fell to almost zero. This can be used to drive a meter and after suitable calibration, a measurement can then be obtained of the wind velocity independent of the amibent temperature.

It will be appreciated that the illustrated circuit might well be varied and other circuits could conveniently be designed by a person skilled in the art whereby a transistor is used as a heat loss anemometer with its power dissipation constant and independent of its temperature and providing an electrical output proportional to the transistor temperature rise above ambient temperature but independent of ambient temperature over a relatively wide range. In the illustrated circuit the temperature rise above ambient temperature was the observed variable to be related to the wind velocity by calibration, in a wind tunnel for example. The availability of transistors in a small size (0.070 inch diameter bead) allows a small power dissipation and a suitable thermal time constant. Furthermore, it was found that a transistor in the circuit of FIG. 1 offered a unique combination of features which offered substantial avantages over the above-mentioned prior transducers used in anemometer instruments. Their dissipation was easily controlled so as to be independent of temperature and their p-n junctions were conveniently used to measure their temperature. The forward voltage drop across the junction, at constant current, varies, as mentioned, linearly with temperature over a wide range and because of this linearlity it was found in practice that one can compensate for a wide variation of ambient temperature by the use of the additional semiconductor diode. Thus, it was possible to measure wind velocity electrically by using a portable direct-reading battery-powered instrument, according to the present invention, which could be compensated for ambient temperature variation over a relatively wide range (say, −40°C. to 20°C or even 40°C) and yet be insensitve to wind direction.

Figure 2:
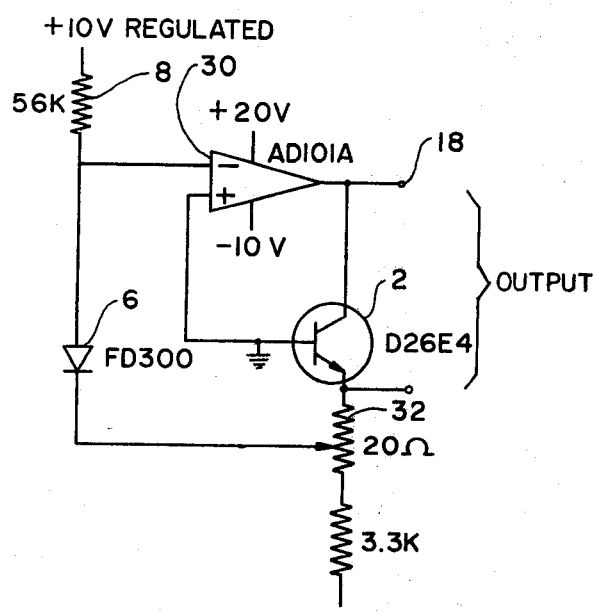

In the above description the transistor dissipation is kept constant by a particular mode of operation which appears to be an advantageous one. However, it will be appreciated that other modes of operation are also possible and, for example, the transistor temperature might be maintained constant by adjusting $V_p$ so as to keep $V_e$ constant. The transistor dissipation (approximately proportional to $V_p-V_e$) would then be the measure of the wind velocity, but the calibration would be different for different ambient temperatures. Yet another possible mode of operation would be to maintain the transistor temperature a constant amount above ambient temperature which could be done by varying $V_p$ so as to keep the voltage constant at the output terminal 18. This could be done automatically by means of an operational amplifier as illustrated in FIG. 2. For convenience, the same reference numerals are used in FIG. 2 as have been used for corresponding parts in FIG. 1, and it will be seen that the operational amplifier 30 is arranged with its inverting (negative) input connected to the junction of diode 6 and resistor 8 whilst its non-inverting (positive) input is connected to the base of transistor 2, as shown. The 20 ohm resistor 32 is adjustable so as to obtain the desired temperature rise of the transistor above ambient temperature and the transistor collector-to-emitter voltage could then be calibrated against the wind velocity. This calibration would be independent of ambient temperature over a wide range.

From FIG. 2 it will be apparent that the voltage at the inverting (negative) input of operational amplifier 30 may be considered as the sum of three voltages. These are the emitter to base voltage, an adjustable offset voltage and a voltage derived from diode 6 which varies linearly with ambient temperature. If these voltages are represented respectively by $V_{EB}$, $V_O$ and $V_D$ then the voltage at the inverting (negative) input of operational amplifier 30 is given by $(V_{EB} + V_D + V_O)$.

In the above description a measurement is taken of the temperature rise of the respective transistor above ambient temperature. This is because it is a convenient variable to observe and one which can be related to the wind velocity by calibration. Similarly, in the example of FIG. 2, the collector voltage is chosen as the observed variable because it can be related to the wind velocity by calibration.

We claim:
1. An anemometer comprising:
   a. a transistor connected in a transistor circuit;
   b. semiconductor diode compensating means connected in parallel with said transistor;
   c. means for obtaining an output voltage representative of the difference between the forward voltage drop across the base-emitter junction of the transistor and the voltage drop across said semiconductor diode, whereby said output voltage is substantially independent of the ambient temperature and is proportional to the temperature rise of said transistor above the ambient temperature; and
   wherein the base electrode of the transistor is connected to ground potential, wherein the collector electrode of the transistor is connected to a voltage $V_p$, wherein the emitter electrode of the transistor is connected through a resistor of resistance $R_1$ to a voltage $V_n$, wherein the semiconductor diode is connected on one side through a resistor having a resistance $R_2$ to the emitter electrode of said transistor and on the other side through a resistor having a resistance $R_3$ to the collector electrode of said transistor, whereby the transistor dissipation is given by the formula;

$$(V_p - V_e) \left[ \frac{V_e - V_n}{R_1} - \frac{V_n}{R_3} \right]$$

whereby $V_e$ is the forward voltage drop across the base-emitter junction of the transistor, and wherein an output terminal is connected to the junction of said diode and the resistor having a resistance $R_3$ whereby said output voltage is obtained at said output terminal and is the difference between $V_e$ and the voltage drop across said semiconductor diode.

2. An electrical device for measuring flow velocity of a fluid comprising:
   a. a transistor mounted in thermal contact with said fluid,
   b. a source of constant voltage,
   c. an electronic circuit connected to the electrodes of said transistor to maintain the power dissipation in said transistor constant, the collector electrode of said transistor being connected to said source of constant voltage with respect to the base electrode, the emitter current being maintained constant,
   d. an output terminal electrically connected to said emitter electrode,
   e. means coupled to said emitter and base electrodes to derive an output signal for said output terminal to drive an indicating device, and wherein the base electrode of the transistor is connected to ground potential, wherein said constant voltage is a voltage $V_p$, wherein said emitter electrode of the transistor is connected through a resistor of resistance $R_1$ to a voltage $V_n$, wherein the output terminal is electrically connected on one side through a resistor having a resistance $R_2$ to the emitter electrode of said transistor and on the other side through a resistor having a resistance $R_3$ to the collector electrode of said transistor, whereby the transistor dissipation is given by the formula;

$$(V_p - V_e) \left[ \frac{V_e - V_n}{R_1} - \frac{V_n}{R_3} \right]$$

whereby $V_e$ is the forward voltage drop across the base-emitter junction of the transistor, whereby said output voltage is obtained at said output terminal.

3. An electrical device for measuring flow velocity of a fluid, compensated for ambient-temperature by means of a semiconductor diode and comprising:
   a. a transistor mounted in thermal contact with said fluid.
   b. an electronic circuit connected to the electrodes of said transistor and including a semiconductor diode and an operational amplifier to maintain the temperature of said transistor above ambient temperature by a constant amount, the collector electrode of said transistor being connected to the output of said operational amplifier, the emitter current of the transistor being maintained constant, the positive or non-inverting input of said operational amplifier being connected to the base electrode of said transistor, the negative or inverting input of said operational amplifier being connected to a source of voltage, equal to $(V_{EB} + V_D + V_O)$ with respect to said base electrode, wherein $V_{EB}$ is the emitter-to-base voltage of said transistor, $V_D$ is a voltage derived from the diode which varies linearly with ambient temperature, $V_O$ is an adjustable offset voltage, said operational amplifier being supplied with electric power from sources of positive and negative direct voltage, a resistor being connected in the emitter circuit of the transistor, said resistor having an adjustable tap and said diode being connected between the adjustable tap on said resistor and said negative or inverting input of said operational amplifier, and
   c. said operational amplifier being coupled to the electrodes of said transistor to control the voltage at the collector electrode of the transistor, an output signal being derived which is proportional to the voltage difference between the collector and emitter electrodes of the transistor and which signal is provided to output terminals to drive an indicating device.

* * * * *

UNITED STATES PATENT OFFICE
CERTIFICATE OF CORRECTION

Patent No. 3,968,685     Dated July 13, 1976

Inventor(s) Lloyd E. MacHattie

It is certified that error appears in the above-identified patent and that said Letters Patent are hereby corrected as shown below:

On the Title Page, Item /54/ should read
----- Transistor Flowmeter ----.

*Signed and Sealed this*

Twenty-ninth *Day of* March 1977

[SEAL]

Attest:

RUTH C. MASON
*Attesting Officer*

C. MARSHALL DANN
*Commissioner of Patents and Trademarks*